June 25, 1946.  A. C. PURPURA  2,402,576
TIMER FOR TOASTERS
Filed Nov. 23, 1942  2 Sheets-Sheet 1

Inventor:
August C. Purpura,
By: Wm. F. Freudenreich,
Attorney.

June 25, 1946.     A. C. PURPURA     2,402,576
TIMER FOR TOASTERS
Filed Nov. 23, 1942     2 Sheets-Sheet 2
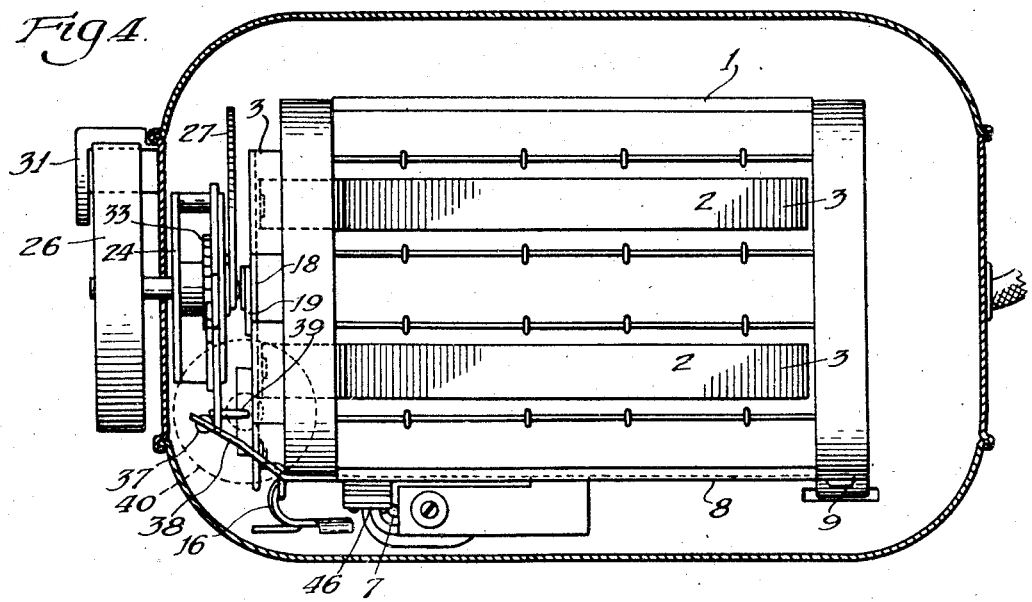
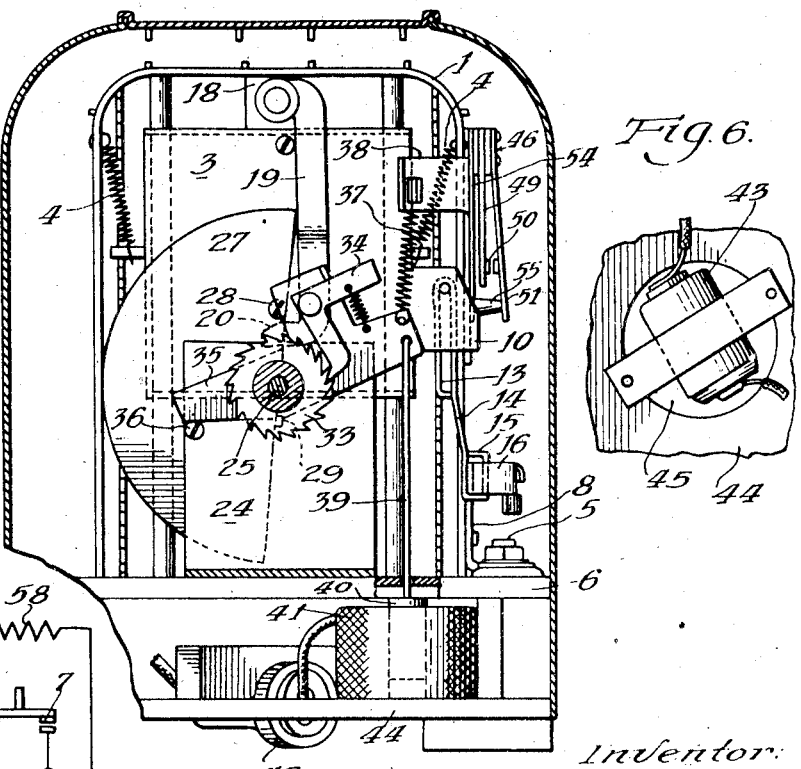
Inventor
August C. Purpura
By Wm. F. Freudenreich,
Attorney Patented June 25, 1946

2,402,576

UNITED STATES PATENT OFFICE 2,402,576

TIMER FOR TOASTERS

August C. Purpura, Chicago, Ill.

Application November 23, 1942, Serial No. 466,539

12 Claims. (Cl. 99—328)

There have heretofore been many different kinds of timing devices for electric toasters, all of which have been open to the objection of being too costly, too complicated, structurally, too apt to get out of order or too uncertain in operation, or requiring too much attention on the part of the user for setting the same to secure the desired results. The object of the present invention is to produce a simple, novel, rugged timing device which is free from all the aforesaid faults and capable of operating effectively and efficiently for the life of the toaster to which it is applied.

In carrying out my invention, I provide a dialing device on the order of that commonly used on telephones; the movement of this device by the user causing the toast holder to be lowered and locked in position and means to be set in operation to stop the toasting process, after a predetermined interval of time, depending upon the angle through which the dial was originally turned. Since the length of the toasting period is determined by the angle through which the dialing device is turned by the user, the length of each toasting period is determined without respect to the length of the preceding period. In other words, one piece of bread may be toasted until it is dark, while the next piece of toast may be delivered while its color is light, without requiring the user to do more than insert a finger in the proper hole in the dial in order to turn the latter and start a toasting process.

Figure 1:
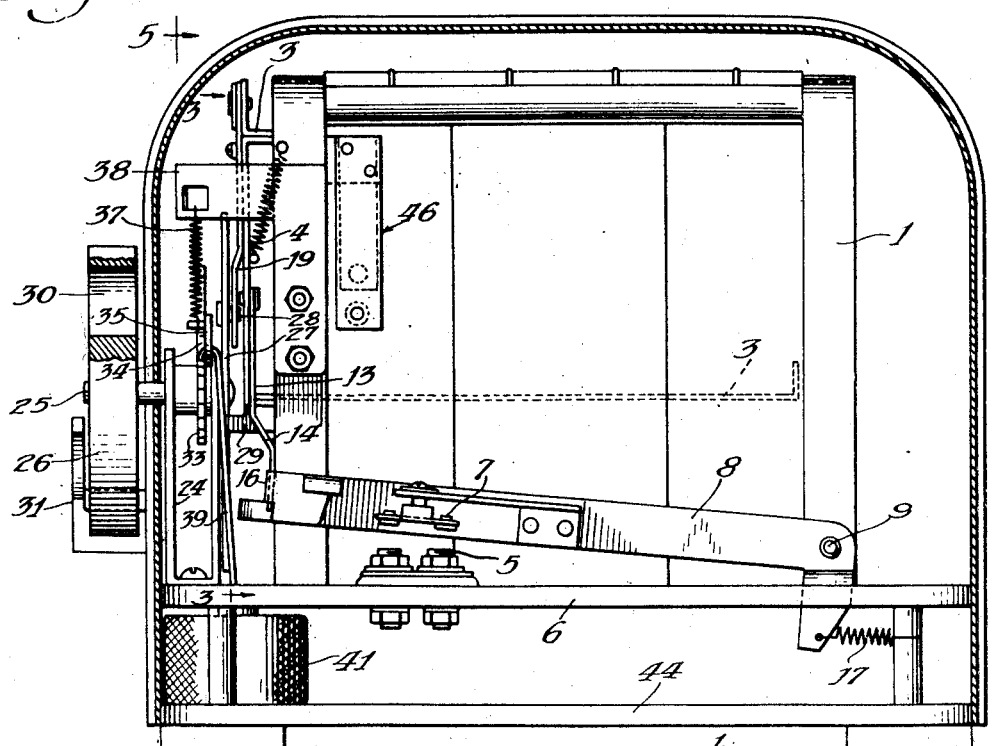
Figure 2:
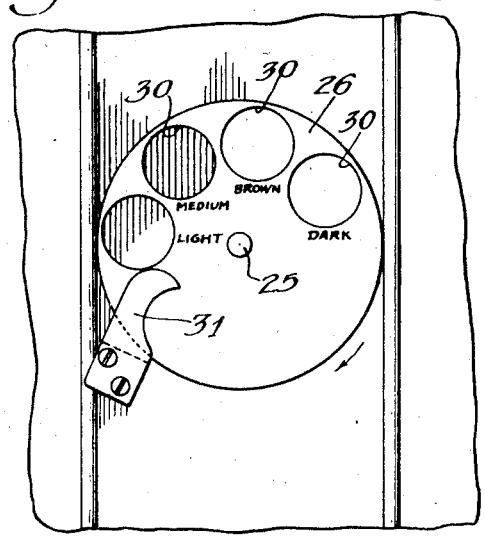
Figure 3:
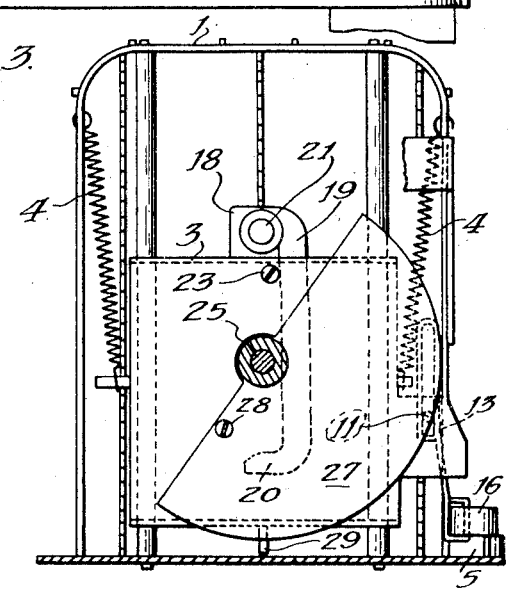

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side elevation of a toaster equipped with my improved timing device, the housing being shown in section; Fig. 2 is an end view of a fragment of the toaster, illustrating the dial. Fig. 3 is a section on line 3—3 of Fig. 1, the casing being omitted; Fig. 4 is a top plan view of the toaster, the casing or housing being shown in section; Fig. 5 is a section on line 5—5 of Fig. 1; Fig. 6 is a plan view of a fragment of the bottom wall of the base, showing the automatic interrupter; and Fig. 7 is a diagram of connections.

Referring to the drawings, I represents any usual or suitable toasting construction which, in the arrangement shown, has two compartments 2 open at the top, that receive slices of bread to be toasted. Mounted within this structure for vertical movements with respect thereto, and projecting somewhat from one end thereof, is a toast holder 3 of any usual or suitable construction. When otherwise unrestrained, the holder is held in the raised position illustrated in Figs. 1 and 5. When the holder is pushed or drawn down to the position indicated in Fig. 3, the springs 4 are stretched and their tension increased, so that the holder will remain down only as long as it is locked in that position.

The toast holder operates a switch which is closed while the holder is down and which opens when the holder rises. In the arrangement shown, the stationary member 5, of the switch is mounted on top of the base 6 on which the toasting structure is supported. The movable member 7 of the switch is carried by a long arm or bar 8 hinged at one end, as indicated at 9, to a part of the stationary structure I for vertical swinging movements. The other end of the arm or bar extends beyond that end of the toasting structure, which may be called the front end, beyond which the toast holder protrudes. The front end of the toast holder is provided with a little bracket, in the form of a plate 10 projecting laterally therefrom on the side at which the aforesaid switch is located. This bracket is provided with a pin 11 that extends through a vertically-elongated loop 13 at the upper end of a wire 14 which is provided at its lower end with another, shorter loop 15 that surrounds a lug or finger 16 projecting inwardly from the free end of the switch arm. A spring 17, best shown in Fig. 1, tends constantly to hold the main switch closed. With the construction just described, the switch is held closed by its own spring and not by any force exerted by the toasting apparatus for, as appears in Fig. 3, the pin 11 stands far down in the loop 13 when the toast holder is down, but is still at a considerable distance above lower end of the loop. It is only when the toast holder rises so as to cause the pin 11 to engage with the upper end of the loop, that the holder exerts any influence on the switch; the switch arm being swung up during the continued rise of the holder, until the switch is wide open as shown in Fig. 5.

At the center of the top of the front end of the toast holder is an upwardly projecting lip or flange 18. Connected to this part is the upper end of a long arm 19 provided at the lower end with a short arm 20 extending laterally, at right angles thereto. The upper end of the arm 19 also has a lateral projection on the same side as the short arm 20, and the connection between the arm 19 and the part 18 comprises a pivot pin 21 that extends through this upper projection. In other words, the arm 19, which with the short arm 20, may be termed a hook and tends to hang at a small angle to the vertical. On the front wall of the toast holder is a stop, which may conveniently be a screw 23 which engages with an edge of the arm 19 while the latter is in a vertical position, so that the weight of the arm tends constantly to hold the arm against this stop.

Rising from the top wall 6 of the base, in front of the toasting structure 1, and spaced apart therefrom, is a pedestal 24 which may conveniently be a long flat bar bent into the shape of a long, narrow U. Extending through the upper end of this pedestal is a shaft 25 on the outer end of which is fixed the disk 26 of a dialing device. On the inner end of the shaft, between the pedestal and the toast holder, is a large metal plate 27 which is shown as being a half-disk. On the half-disk is a pin 28 which, when the toast holder is up and all of the other parts of the apparatus are in the positions they normally occupy when the toast holder is in its raised position, lies directly over the short arm 20 of the swinging hook, as shown in Fig. 5. If the shaft 25 is now turned in the clockwise direction as viewed in Fig. 5, the pin 28 engages with the arm 20 of the hook and draws the hook down to the position illustrated in Fig. 3, namely that corresponding to the toasting position of the holder. If the holder is now locked in its downward position the half-disk may continue moving in the same direction as that which it traveled in forcing the toast holder down. In the arrangement shown I employ the half-disk itself for the purpose of holding the toast holder down.

It will be seen that at the front end of the toast holder there is a lug or finger 29 projecting forwardly from the bottom of the holder. This lug or finger extends past the plane of the half-disk 27. Normally when the parts are all in positions ready to start, the lug or finger 29 lies just below the shaft 25 and beside the straight edge of the half-disk as shown in Fig. 5. Consequently, the half-disk may turn in the clockwise direction without interference on the part of the lug or projection and, as such movement proceeds, the toast holder and the lug or finger 29 move downwardly together. Before the straight edge of the half-disk can strike the lug the latter is down far enough to permit the curved edge of the half-disk to ride over the same, as shown in Fig. 3. The pin 28 can then move on, away from the hook, because the curved edge of the half-disk overlies the lug 29 and thus locks the toast holder down. The toast holder cannot move up again until after the half-disk has completed a full turn from the starting point indicated in Fig. 5 thereby causing the trailing end of the curved periphery of the half-disk to be carried past the lug 29.

If means are provided automatically to continue the turning movement of the half-disk at a given constant speed to complete the revolution initiated manually, any desired length of toasting time, within limits, may be attained by varying the angle through which the half-disk is turned manually.

The manual operating means consists of the disk 26 fixed on the outer end of the shaft 25; this disk having therein a series of finger holes 30 spaced apart angularly of the disk. Beside this disk is a stationary stop 31. When a user places a finger in any one of the holes 30 and turns the disk until the finger is arrested by the stop 31, the half-disk is turned at least far enough to cause the curved edge thereof to move upon the lug 29, locking the toast holder down, so that the finger may be withdrawn. In the arrangement shown, the disk may be turned through almost a complete revolution, so that the automatic turning mechanism need only turn the setting unit through a small angle to end the toasting period; or, the manual setting may involve the turning of the disk through an angle of about one hundred and eighty degrees at the other limit of the range of adjustments. In this way short, long or intermediate toasting periods may be attained.

In order to effect the automatic movements of the shaft 25 and disk and half-disk thereon, I provide an electromagnetic actuator that drives the shaft step by step at a predetermined uniform rate. The immediate driving means consist of a ratchet wheel 33 fixed on the shaft in front of the half-disk, together with a paul 34 carried by a rocker arm 35, loose on the shaft. One end of the rocker arm normally rests on a stationary pin 36 projecting rearwardly from the pedestal 24. A tension spring 37 is connected at its ends to the other end of the rocker arm and to a bracket 38 on the toasting structure 1; this spring being under sufficient initial tension to hold the rocker arm against the pin 36. A heavy wire or light rod 39 is connected at its upper end to the same end of the rocker arm as that to which the spring 37 is attached. The lower end of the wire or rod 39 is secured to the plunger 40 of an electromagnet 41. The spring 37 is sufficiently strong to hold the plunger 40 up when the electromagnet is deenergized. Upon energization of the magnet, the rocker arm is turned in the clockwise direction, as viewed in Fig. 5, turning the shaft 25 through a predetermined small angle. Upon deenergization of the electromagnet, the parts of the driving mechanism return to the condition illustrated in Fig. 5, the pawl riding over one or more teeth on the ratchet wheel.

The supply of current to the electromagnet is controlled by a device which, when energized, opens and closes a controlling switch, according to a definite timing. This device may conveniently be of the type conventionally illustrated at 43, which is commonly used for turning on and off the current for the lights of an electric sign to produce a flashing effect. This device is mounted on the bottom wall 44 of the base member of the toaster, across a large opening 45 which permits free circulation of air around and past the device. Current is supplied to the interrupter 43 through the main switch comprising the stationary contacts 5 and the movable contacts 7. Therefore, as soon as the dial is turned to move the toast holder down to predetermine the toasting period, the interrupter will be energized unless some means be provided to prevent it. That is, starting with the toaster in a cold state, the first piece of toast would not be toasted to the same degree as would later pieces, after the toaster became well heated. I have, therefore, placed in the control circuit a switch 46 that remains open, while the toaster is cold, until it has been heated to a predetermined temperature. This switch comprises a stationary arm 49 carrying a contact piece 50, together with a movable arm 51, carrying a contact piece 53, for engagement with the contact piece 50. These two switch members, together with a bimetallic bar 54, are mounted on a part of the toasting structure 1, with the bimetallic element on the inner side. The bimetallic element has at its free end a lug 55 that projects laterally into contact with one side of the switch arm 51, near the free end of the latter. Normally, when the toaster is cold, the switch arm 51 is forced outwardly to separate the contacts 50 and 53 from each other. When the toaster heats up, the bimetallic element becomes deformed in a manner to carry the lug thereon away from the switch arm 51; and this switch arm being resilient, it carries its contact piece into engagement with the cooperating contact piece and closes the circuit.

The various circuits and switches are shown in the wiring diagram, Fig. 7. Referring to this diagram, 56 and 57 are the supply lines; 58 indicates the heating coils of the toaster; 59 is a coil surrounding and adapted to heat a bimetallic element 60; and 61 is a switch adapted to short circuit the coil 59, which is normally in series with the coil of the electromagnet 41, when the bimetallic element becomes hot. It will be seen that all circuits are open until the toast holder is pressed down and the main switch, comprising contacts 5 and 7, is closed. Upon the closing of the main switch, current flows through the heating coils of the toaster and the toaster begins to heat up if it was cold at the start. However, no current flows through the coils 41 and 59 until the compensating switch 46 has been closed, namely after the toaster becomes hot. After the toaster becomes properly heated, the compensating switch closes and current begins to flow through the coils 59 and 41; such current being sufficient to heat the bimetallic element 60 but not strong enough to cause the plunger 40 to be pulled down and operate the pawl and ratchet device. When the bimetallic element 60 becomes heated to a predetermined temperature, it closes the switch 61, short circuiting the coil 59 and thereby causing an increase in the current flowing through the coil 41 sufficient to drive the ratchet wheel 33 through one step. As soon as current stops flowing through the coil 59, it and the bimetallic element begin to cool and the switch 61 is again opened when the temperature of the bimetallic element drops to a predetermined value. The process of closing and then opening the switch 61 proceeds automatically until the half-disk 27 has been turned around to the normal idle position and the main switch again opens.

It will be seen that the user of a toaster equipped with my improved timing device need only place the bread in the holder, place a finger in that hole in the dial corresponding to the type of toasting desired, turn the dial until that finger strikes the stop 31, and then direct his attention to other things, in order to be certain that the bread will be properly toasted to the extent desired. This is as true with respect to the first piece of bread, starting with a cold toaster, as with subsequent pieces, after the toaster has become hot, by reason of the presence of the compensating switch that provides a longer toasting period when the toaster is cold than when it is hot.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. The combination with a toasting apparatus including a toast holder movable from a toasting position to a delivery position, of a rotatable manually operable dial, means operated by the dial to shift the holder from the delivery position to the toasting position during a predetermined angular movement in one direction by the dial, further means operated by the dial for locking the holder in its toasting position during a further movement of the dial in the same direction through a further predetermined angle and then to release it, and means automatically to restore the holder to its delivery position upon being unlocked.

2. The combination with a toasting apparatus including a toast holder movable from a toasting position to a delivery position, of a rotatable manually operable dial, means operated by the dial to shift the holder from the delivery position to the toasting position during manual operation of the dial through a predetermined angle in one direction, further means operated by the dial to cause the holder to be locked in its toasting position during a further movement of the dial in the same direction and to be unlocked when the total movement of the dial approximates a complete revolution, and means to restore the holder to its delivery position upon being unlocked.

3. The combination with a toasting apparatus including a toast holder movable from a toasting position to a delivery position, of a rotatable dial, means operated by the dial to shift the holder from the delivery position to the toasting position during manual operation of the dial through a predetermined angle in one direction, further means operated by the dial to cause the holder to be locked in its toasting position during a further movement of the dial in the same direction and to be unlocked when the total movement of the dial approximates a complete revolution, means automatically to complete the revolution of the dial started by manual operation thereof, and means to restore the holder to its delivery position upon being unlocked.

4. The combination with a toasting apparatus including a toast holder movable from a toasting position to a delivery position, of a rotatable dial, means operated by the dial to shift the holder from the delivery position to the toasting position when the dial is turned manually through a predetermined angle in one direction, indexing means adjacent to the dial to enable the user to turn the dial through said angle or through any one of a plurality of progressively greater predetermined angles, means operated by the dial to cause the holder to be locked in its toasting position during a movement of the dial in the same direction beyond the first-mentioned predetermined angle and to be unlocked when the total movement of the dial approximates a complete revolution, means automatically to complete the revolution of the dial started by the manual operation thereof, and means to restore the holder to its delivery position upon being unlocked.

5. The combination with a toasting apparatus including a toast holder movable from a toasting position to a delivery position, a rotatable arc-shaped element, means operated by said element to cause the holder to move from the delivery position to the toasting position when said element is turned through a predetermined angle in one direction, and means engaging with and operated by said element to lock the holder in the toasting position during a further turning movement of said element to complete a revolution and then release it.

6. The combination with a toasting apparatus including a toast holder movable from a toasting position to a delivery position, a rotatable arc-shaped element, means movable with said element to cause the holder to move from the delivery position to the toasting position when said element is turned manually through a predetermined angle in one direction, additional means movable with said element to lock the holder in the toasting position during a further turning movement of said element to complete a revolution and then release it, and means automatically to complete a revolution of said element begun by manual operation thereof.

7. The combination with a toasting apparatus including a toast holder movable from a toasting position to a delivery position, a rotatable arc-shaped element, means movable with said element to cause the holder to move from the delivery position to the toasting position when said element is turned manually through a predetermined angle in one direction, additional means movable with said element to lock the holder in the toasting position during a further turning movement of said element and then release it, means automatically to complete a revolution of said element begun by manual operation thereof, and spring means to move the holder into its delivery position upon being released by the arc-shaped element.

8. The combination with a toasting apparatus including a toast holder movable from a toasting position to a delivery position, a rotatable half-disk, means cooperating with said half-disk to cause the holder to move from the delivery position to the toasting position, when the half-disk is caused to make a half turn in one direction, and means on the toast holder cooperating with the half-disk to lock the holder in the toasting position during a further half turn of said half-disk and then release it, and spring means to move the holder into its delivery position upon being released by the half-disk.

9. The combination with a toaster having a vertically movable toast holder, of a long hook hung from the middle of the top of the holder at one end for swinging movements parallel to said end, an outwardly-projecting lug at the bottom of the holder at the middle of said end, a sector of a disk mounted for rotation about an axis parallel to said end in a plane lying outwardly from said hook and intersecting said lug, and a pin on said sector for engagement with said hook to pull the holder down, the parts being so proportioned that the curved edge of the sector rides on top of said lug and locks the holder down before said pin releases itself from the hook.

10. The combination with a toast holder movable from a toasting position to a delivery position and a switch that is opened when the holder reaches the delivery position and closed when the holder reaches the toasting position, of a rotatable dial, means to cause the dial to shift the holder from the delivery position to the toasting position during manual operation of the dial through a predetermined angle in one direction, means to cause the holder to be locked in its toasting position during a further movement of the dial in the same direction and to be unlocked when the total movement of the dial approximates a complete revolution, means, including an electro-magnet, for automatically continuing the turning movements of the dial step by step, after the switch has been closed, to complete a revolution of the dial, and means to restore the holder to its delivery position upon being unlocked.

11. An apparatus such as described in claim 10, having associated therewith an automatic interrupter for controlling the energization of the electromagnet.

12. An apparatus such as described in claim 10, in which there is also included a heat responsive element that is alternately heated and cooled upon the closing of the switch, said element controlling the energization of the electromagnet.

AUGUST C. PURPURA.